No Printed Specification Available
C. Daniels.
5894X
Milling Machine.
Patented Mar. 30, 1830.
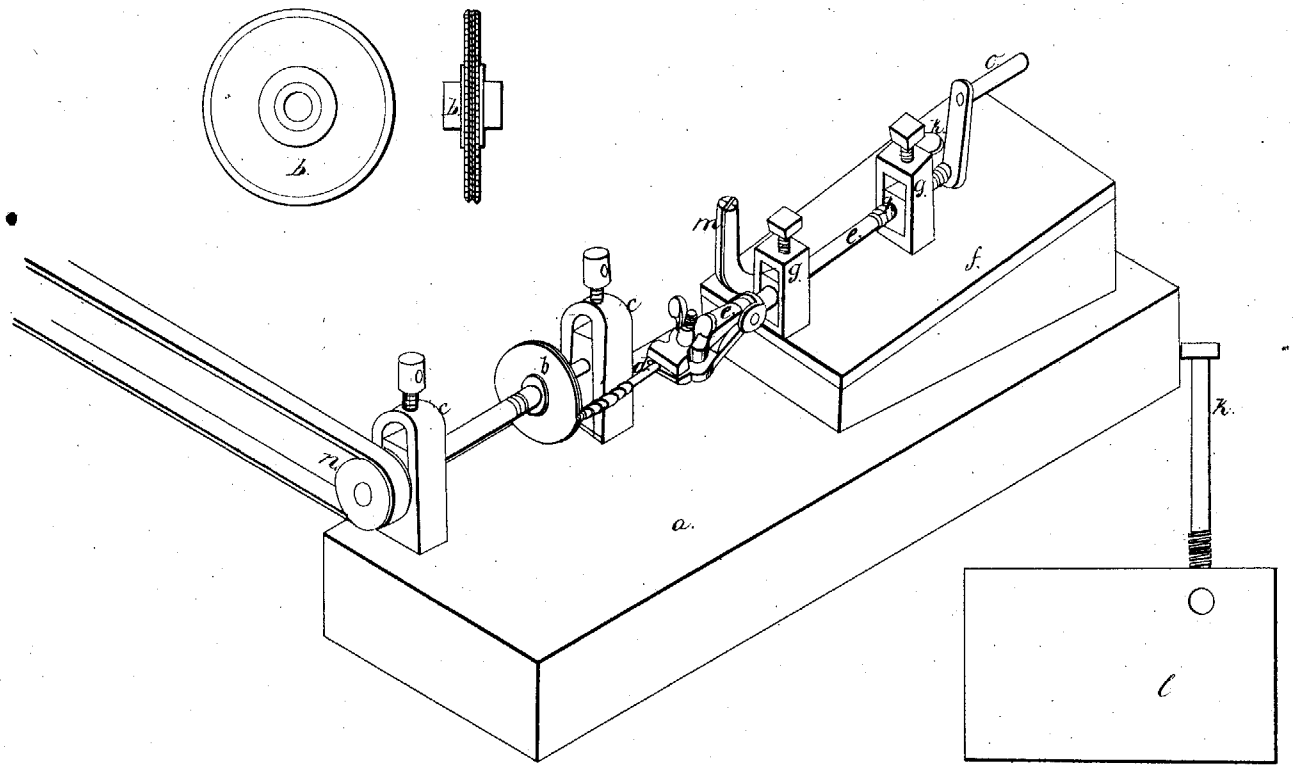
THE GRAPHIC CO. PHOTO-LITH. 39 & 41 PARK PLACE, N.Y.

Charles Daniels assignee of Wm W. Southworth's
Letters Patent. (Patented March 30 1830.)

The Schedule referred to in these Letters Patent & making part of the same
containing a description in the words of the said Charles Daniels himself, of his
improvement in a Machine for Cutting the Screws of Gimblets, which Invention
he has assigned in due form of Law to Charles Daniels, of Saybrook, Middlesex County,
Connecticut, which assignment is recorded in the Patent Office in the Book of
Transfers, Pages 254 & 255.

---

Be it known, that I, Charles Daniels, of the Town of Saybrook, in the Coun-
ty of Middlesex & State of Connecticut, have constructed, made & applied to use
a new & useful improvement in a Machine for cutting the screws of Gimblets,
as invented and suggested by William W. Southworth (whose right & interest
is hereinafter assigned to me) & that the following is a full & exact de-
scription of the construction & operation of the said Machine as improved
by said Southworth and myself.

This Machine is generally placed upon a bed or basement of wood two feet long,
eight inches wide & three inches thick. The buzz arbor is placed about two inches
from the back side & left hand end of the bed, in two poppet heads, with suitable
boxes to sustain it about three inches above the top of the bed. This arbor is made of cast
steel, with suitable points or ends to run in the before mentioned boxes, is about
eight inches long, & one half an inch in diameter, with proper shoulders or col-
lars to receive the buzz, which is placed about two inches from the right hand end be-
tween the collars upon the arbor. This buzz, which should be made of hard cast
steel, from one to three inches in diameter, & three eighths of an inch thick, with its
periphery turned to form two cutting parts or edges at suitable distances & forms for
cutting the double screw of a Gimblet at one & the same operation.

The Gimblet to be cut is placed in a vice similar to a Goldsmiths or Watchmakers
pin vice, to which vice a screw is connected which plays nearly horizontally & in
a direct Line with the gimblet thro' two standards or poppet heads raised from the car-
riage a suitable height to receive the screw about one & a half inches above the carriage bed.

This screw must have a thread where it passes thro' the right hand standard or poppet head as coarse or equal to the double edge in the buzz or a double thread o
the screw in the Gimblet. Its use is to guide and propel the gimblet, or move it fo
wards & backwards while cutting. The carriage bed is about nine inches long, five
inches broad & three fourths of an inch thick, & is made to turn upo
a pivot or screw which is placed about one inch from the back side, & three inc
from the right hand end of the bed. This pivot or screw fastens the carriage to
a wedge of the same length & width as the carriage bed, and about three inche
thick at the right, & one and a half inch at the left end, causing an inclinati
of the carriage to the bed, and should be placed upon the main bed at a suitabl
angle to bring the threads of the Gimblet about square with the buzz.

This machine may be put in motion by any convenient power being ap
plied to a band leading over a small wheel on the left hand end of the buzz arbor,
& the operator applying his right hand to a crank upon the right hand end
of the vice screw shaft. & his left hand to a handle fixed to the front corner o
the left hand end of the carriage, to bring the Gimblet in contact with the buzz.

What I claim as new & by virtue of said William W. Southworth's assign
ment to me, as my own invention or discovery in the above described Machine, & fo
the use of which I ask an exclusive privilege, is the application of the double edged
buzz, by which both screws of a Gimblet may be cut at the same time & by the
same operation.

In testimony whereof I have hereunto set my hand & seal this 22
day of February A. D. 1830.

(Witnesses)
Julia S. Hommedieu
Joshua S. Hommedieu

Charles Daniels
(784 words)

Whereas I, William W. Southworth, of Saybrook, in the County of
Middlesex & State of Connecticut, claim to have invented an improvement
in the art of cutting the screws of Gimblets by means of a double buzz or a buzz
with two edges made & applied in the manner described in the foregoing spe-
cification, and in consideration of five dollars received to my full satisfaction
of Charles Daniels of said Town of Saybrook, do for myself, my heirs & legal representatives hereby sell, convey & assign unto the said Charles Daniels, his heirs and assigns, all my right title & interest, in the aforesaid invention; also, all the right, title & interest, which I have exclusively to the Machine described in the aforesaid specification or any part thereof; also all my right, title, & interest, which I have exclusively to improving, using & vending the same.

In testimony whereof, I have hereunto set my hand & seal, this 22nd day of February A.D. 1830.

Witnesses
Julia S. Hommedieu
Joshua S. Hommedieu

Wm. W. Southworth
(Seal)

(Rec.d & Recorded Seventh day of November 1840, & Exd. W.G.C.)